US006772375B1

(12) United States Patent
Banga

(10) Patent No.: US 6,772,375 B1
(45) Date of Patent: Aug. 3, 2004

(54) AUTO-DETECTION OF LIMITING FACTORS IN A TCP CONNECTION

(75) Inventor: Gaurav Banga, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 542 days.

(21) Appl. No.: 09/748,070

(22) Filed: Dec. 22, 2000

(51) Int. Cl.[7] .......................... G06F 11/00; H04L 1/22
(52) U.S. Cl. ........................................ 714/47; 714/18
(58) Field of Search ............................ 714/47, 56, 51, 714/18, 20, 21, 36, 37, 39; 709/220, 221, 223, 225, 229, 234

(56) References Cited

U.S. PATENT DOCUMENTS

| | | | |
|---|---|---|---|
| 3,893,024 A | | 7/1975 | Reines et al. |
| 4,937,763 A | | 6/1990 | Mott |
| 5,049,873 A | | 9/1991 | Robins et al. |
| 5,067,099 A | | 11/1991 | McCown et al. |
| 5,107,500 A | | 4/1992 | Wakamoto et al. |
| 5,377,196 A | | 12/1994 | Godlew et al. |
| 5,621,663 A | | 4/1997 | Skagerling |
| 5,664,107 A | | 9/1997 | Chatwani et al. |
| H1860 H | | 9/2000 | Asthana et al. |
| 6,163,853 A | | 12/2000 | Findlay et al. |
| 6,173,333 B1 | * | 1/2001 | Jolitz et al. ............... 709/240 |
| 6,295,557 B1 | * | 9/2001 | Foss et al. ................. 709/224 |
| 6,330,560 B1 | * | 12/2001 | Harrison et al. ............... 707/8 |
| 6,363,429 B1 | * | 3/2002 | Ketcham .................... 709/235 |
| 6,415,312 B1 | * | 7/2002 | Boivie ....................... 709/200 |
| 6,473,425 B1 | * | 10/2002 | Bellaton et al. ............ 370/392 |
| 6,622,172 B1 | * | 9/2003 | Tam .......................... 709/232 |
| 6,625,166 B2 | * | 9/2003 | Tsukamoto et al. ......... 370/466 |

* cited by examiner

Primary Examiner—Nadeem Kobal
(74) Attorney, Agent, or Firm—Swernofsky Law Group PC

(57) ABSTRACT

This invention comprises auto-diagnosis logic that can be implemented in operating systems in an appliance-like auto-diagnosis module coupled to the TCP receiver, the TCP sender or both. TCP events are sampled and a set of statistics on these events is maintained. Receiver side TCP diagnostic techniques include detecting sender's re-transmission timeouts, evaluating the average size of packets being received, determining if a receiver is a bottleneck, and performing other evaluations of an incoming data stream. Sender side diagnostic techniques include flagging transmission timeouts, monitoring the average size of a transmitted packet, evaluating if the advertised window accounts for the delay-bandwidth product of the network connecting the receiver and the sender systems, performing bottleneck checks, and other evaluations of an outgoing data stream. The results are aggregated using system attributes. Systems with common problem areas and attributes are grouped together. The TCP auto-diagnosis logic can be performed on-line or off-line.

49 Claims, 5 Drawing Sheets

AUTO-DETECTION OF LIMITING FACTORS IN A TCP CONNECTION

BACKGROUND OF THE INVENTION

1. Field of the Invention

The invention relates to diagnosing Transmission Control Protocol (TCP) performance problem situations.

2. Related Art

TCP is one of the most widely used transport protocols. Used both in the Internet and in many intranets, TCP is used for HTTP (Hypertext Transfer Protocol) and CIFTS (Common Internet File System) traffic, as well as NFS (Network File System) data. Although TCP is a robust protocol that provides reliable connection-oriented communication over a wide variety of networks and at a variety of speeds, the observed rate of data transfer may be less than anticipated because (1) either data packet receivers or data packet senders or both may be poorly configured or overloaded, (2) a network or a portion thereof may lack sufficient bandwidth (for example, a network that runs at gigabit rates on the fringes may include a megabit link somewhere in the path between the data sender and the data receiver), (3) multiple data packet losses may occur (due to congestion or other reasons) and require course grained re-transmission timeouts or (4) other related causes.

Since most TCP implementations are not designed for easy debugging of problems, various techniques have been designed and implemented to diagnose TCP-related problems. A first technique involves using some type of packet capture mechanism, such as the Berkeley Packet Filters and manual expert analysis of captured low level packet traces so as to isolate abnormal protocol behavior and trace it to misconfigured or overloaded elements in a network path. Although this technique permits the analysis of specific transmissions, it is relatively inconvenient, costly and error prone. A variant of this technique is embodied in a tool developed by LBL researchers called tcpanaly. Tcpanaly automatically analyzes a TCP implementation's behavior by inspecting packet traces of TCP activity using packet filter traces. If a trace is found inconsistent with the TCP specification, tcpanaly may provide a diagnosis (if possible) or an indication of what specific activity is aberrant. Similar to other packet driven systems, Tcpanaly does not focus on the general dynamic behavior of a network, but rather on detecting packet filter measurement errors, and other low-level details of TCP algorithms to handle corner conditions while performing congestion control and dealing with various forms of packet loss.

Other techniques, such as commercial packet sniffer systems include logic that analyzes aggregate TCP statistics of the kind reported by the UNIX netstat command; unfortunately, these other similar techniques are generally limited to a broad analysis of the total connections that the system has ever seen. As such, they are not useful means to detect or diagnose a particular defect in a specific connection between two systems.

Accordingly, it would be desirable to provide a method and system for detecting and diagnosing TCP-related problems. This method is achieved in an embodiment of the invention in which an appliance system including auto-diagnosis logic can be coupled to a network and implement auto-diagnostic techniques for TCP.

SUMMARY OF THE INVENTION

The invention provides a method and system for detecting and analyzing performance defects in the dynamic operation of the TCP protocol. In a preferred embodiment, this invention comprises auto-diagnosis logic that can either be implemented in a variety of operating systems (such as Data ONTAP) in an appliance-like auto-diagnosis module that is coupled to the TCP receiver, the TCP sender or both.

In a first aspect of the invention, TCP events are sampled and a carefully maintained set of statistics on these events is maintained. The granularity of the sampling and the time period sampled may be adjusted so as to meet the requirements of a particular system. These statistics can be used in the diagnosis of defects on either the sender side or the receiver side, or both.

Receiver side TCP diagnostic techniques include (1) detecting sender's re-transmission timeouts, (2) evaluating the average size of packets being received, (3) determining that the receiver does not act as a computational or protocol bottleneck, and (4) performing other statistical evaluations of an incoming data stream.

Sender side diagnostic techniques include (1) flagging excessive transmission timeouts, (2) monitoring the average size of a transmitted packet, (3) evaluating if the advertised window is large enough to account for the delay-bandwidth product of the network connecting the receiver and the sender systems, (4) performing various bottleneck checks, and (5) performing other statistical evaluations of an outgoing data stream.

In a second aspect of the invention, the results of the auto-diagnosis are aggregated using a database that includes known attributes of client systems. Examples of attributes include IP subnet number, OS type/version, last configuration change date, delay distance, route information, virtual LAN information historical summary of auto-diagnosis information and other attributes such as may be useful in aggregating auto-diagnosis information. Client systems with common problem areas and common attributes are grouped together for presentation to a system administrator.

In a preferred embodiment, the TCP auto-diagnosis logic can be performed on-line or off-line. Although this auto-diagnosis logic is relatively non-disruptive, for any reasonable implementation, this feature permits performance of system analysis at non-critical times, for example when the overall demand for computing resources may be relatively low.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

System Elements

Figure 1:
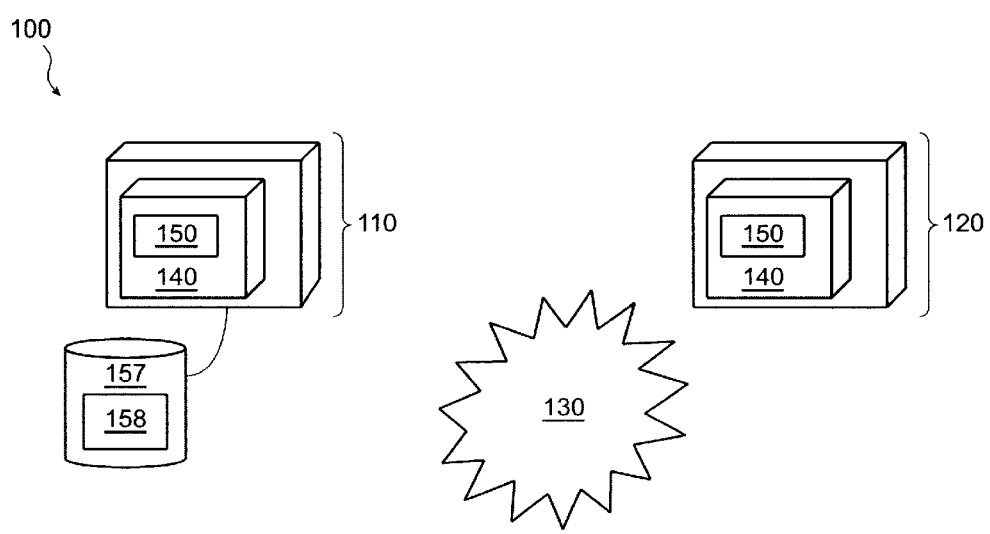
FIG. 1 shows a block diagram of a system for auto-detection of performance limiting factors in a TCP connection

FIG. 1 shows a block diagram of a system for auto-detection of limiting factors in a TCP connection.

A system 100 includes a plurality of TCP receivers 110 and TCP senders 120 coupled to a communications network 130. At least one of the TCP senders 110 or TCP receivers 120 includes an operating system 140 and auto-diagnosis module 150.

The TCP receivers 110 and TCP senders 120 may comprise a general-purpose computer, such as a client workstation, or server or other information appliance falling within the generalized Turing paradigm. Although these devices are categorized as TCP receivers 110 or TCP senders 120, this distinction is based upon the relation between one device and other. A device that is characterized as a TCP receiver 110 for a particular data packet may be characterized as a TCP sender 120 for another data packet.

The communication network 130 is disposed for communicating data between the TCP receivers 110 and the TCP senders 120. In a preferred embodiment, the communication network 130 includes a packet switched network such as the Internet, as well as (in conjunction with or instead of) an intranet, an enterprise network, an extranet, a virtual private network or a virtual switched network. In alternative embodiments, the communication network 130 may include any other set of communication links that couple the TCP receivers 110 and TCP senders 120.

The auto-diagnosis module 150 includes a set of software instructions 155 that may be coupled to an operating system 140 (preferably Data ONTAP). In other embodiments, the autodiagnosis module 150 may take the form of a separate appliance that can be coupled to either a TCP receiver 110 or a TCP sender 120, or both. These software instructions 155 include logical techniques to diagnose problematic conditions on both the TCP receiver 110 and the TCP sender 120, In addition to these logical techniques, the software instructions 155 also include (1) instructions to perform various determination procedures (described infra). (2) instructions to remedy particular problematic conditions, and (3) instructions to aggregate information for presentation to a system administrator.

Software instructions 155 that can be implemented on the TCP receiver 110 side include:

Instructions to detect and evaluate the TCP sender 120 re-transmission time-outs The set of instructions 155 evaluates re-transmission timeouts occurring at the TCP sender 120. The set of instructions 155 includes an instruction to tag each received packet that is inserted into the TCP re-assembly queue. It is possible to distinguish between quiet periods that occur in "bursty" traffic and re-transmission timeouts because the instructions evaluate both (1) the time at which a data packet arrives on each TCP receiver 110 and (2) the sequence number in which the data packets arrive. A number of out-of-sequence packets with a particular inter-packet arrival gap (typically 500 ms) are indicative of a retransmission timeout at the TCP sender.

Average packet size

The instruction set 155 includes an instruction to determine the size of incoming data packets and determine the arrival time of the incoming packet so as to determine if the TCP sender 120 is using sufficiently large frames. The instruction set 155 eliminates confounding information such as control information, or meta-data that are necessarily communicated using small TCP packets by determining the size of those incoming packets that are part of a burst of back-to-back packets. This determination is not performed upon incoming packets that are not part of such a burst. In the event that the average packet size is inappropriately small (such as may occur if an application is poorly written or a network is misconfigured), the instruction set 155 may provide for remedial steps.

Bottleneck checks

The instruction set 155 includes three related subsets of instructions that determine whether the TCP receiver 110 creates a bottleneck in data transfer. A first instruction subset involves monitoring the amount of free space available in a buffer coupled to the TCP receiver 110. A second instruction subset involves monitoring the amount of receiver CPU utilized for protocol processing and comparing the amount of CPU cycles that are consumed by TCP processing to the amount left over as idle time. A third instruction subset involves monitoring the rate at which the receiver application reads from the TCP socket receiver buffers. It is unlikely that a TCP receiver 110 is acting as a computational or protocol bottleneck if (1) packets arrive continually at a roughly constant rate without the amount of free space shrinking substantially, (2) the TCP receiver 110 is not running out of CPU cycles to perform protocol processing or (3) the rate at which receiver application reads from the buffers does not fall below a preset threshold.

Software instructions 155 that can be implemented on the TCP sender 120 side include:

Flagging excessive re-transmission timeouts

The instruction set 155 includes instructions to (1) determine when a coarse-grained re-transmission timer expires and a packet is re-transmitted, (2) determine if the number of re-transmission timeouts on any TCP connection exceeds a particular preset threshold and (3) notify a system manager in the event that this threshold is exceeded.

Average packet size

The instruction set 155 includes instructions to monitor the average size of transmitted data packets sent by a TCP sender 120. Similar to packet size monitoring performed on the TCP receiver 110, limiting the analysis of average packet size to packets included in a back-to-back packet train eliminates a number of factors that would skew the data, such as small packets that carry control information.

Receiver window monitoring

The instruction set 155 on the TCP sender 120 monitors the window advertised by the TCP receiver 110. Specific instructions cause the TCP sender 120 to check if the advertised window is large enough to account for the delay bandwidth product of the path between sender and receiver. The instruction set 155 also controls monitoring of the variation in the TCP receiver's advertised window over time. If the advertised window remains relatively constant, then it is not likely that the TCP receiver 110 is acting as a bottleneck.

Bottleneck checks

Similar to the TCP receiver 110, the instruction set 155 includes various instruction subsets to insure that the TCP sender 120 is not a computational or protocol bottleneck. The first instruction subset involves comparing the size of a buffer coupled to the TCP sender 120 with the full bandwidth of the network path between the TCP sender 120 and TCP receiver 110. If the buffer size is appropriate, then absent other indications such as described below, it is unlikely that the TCP sender is acting as a bottleneck. A second instruction subset involving monitoring the unsent, queued data in the send buffer. A TCP sender 120 may be acting as a bottleneck if there are periods of time in which the TCP sender 120 is unable to send anything. Lastly, a third instruction subset monitors whether the TCP sender 120 can perform protocol processing sufficiently fast so as to maintain pace with the data consumption of the TCP receiver 110. If the protocol processing is performed at a slow rate with respect to the TCP receiver 110, the TCP sender may be acting as a bottleneck.

The instructions to perform various determination procedures include measurement of offline delay calculation by using a periodic ICMP (Internet Control Message protocol) ping and measuring the roundrip time, TCP fingerprinting and making various assumptions regarding bandwidth, MTU size and RTO estimates. These various determination procedures may be used to perform other types of instruction described supra.

In addition to the software instructions 155, the auto-diagnosis module also includes a database 157. The database 157 includes a set of fields 158 describing various attributes of known client systems such as IP subnet number, OS type/version, last configuration change date, delay distance, route information virtual LAN information, historical summary auto-diagnosis information and other such attributes as may be useful when aggregating diagnosis information and presenting it to a system administration. Each field included in the set of fields 158 is assigned an appropriate weight. This weighted value is used when auto-diagnosis results are aggregated.

Figure 2A:
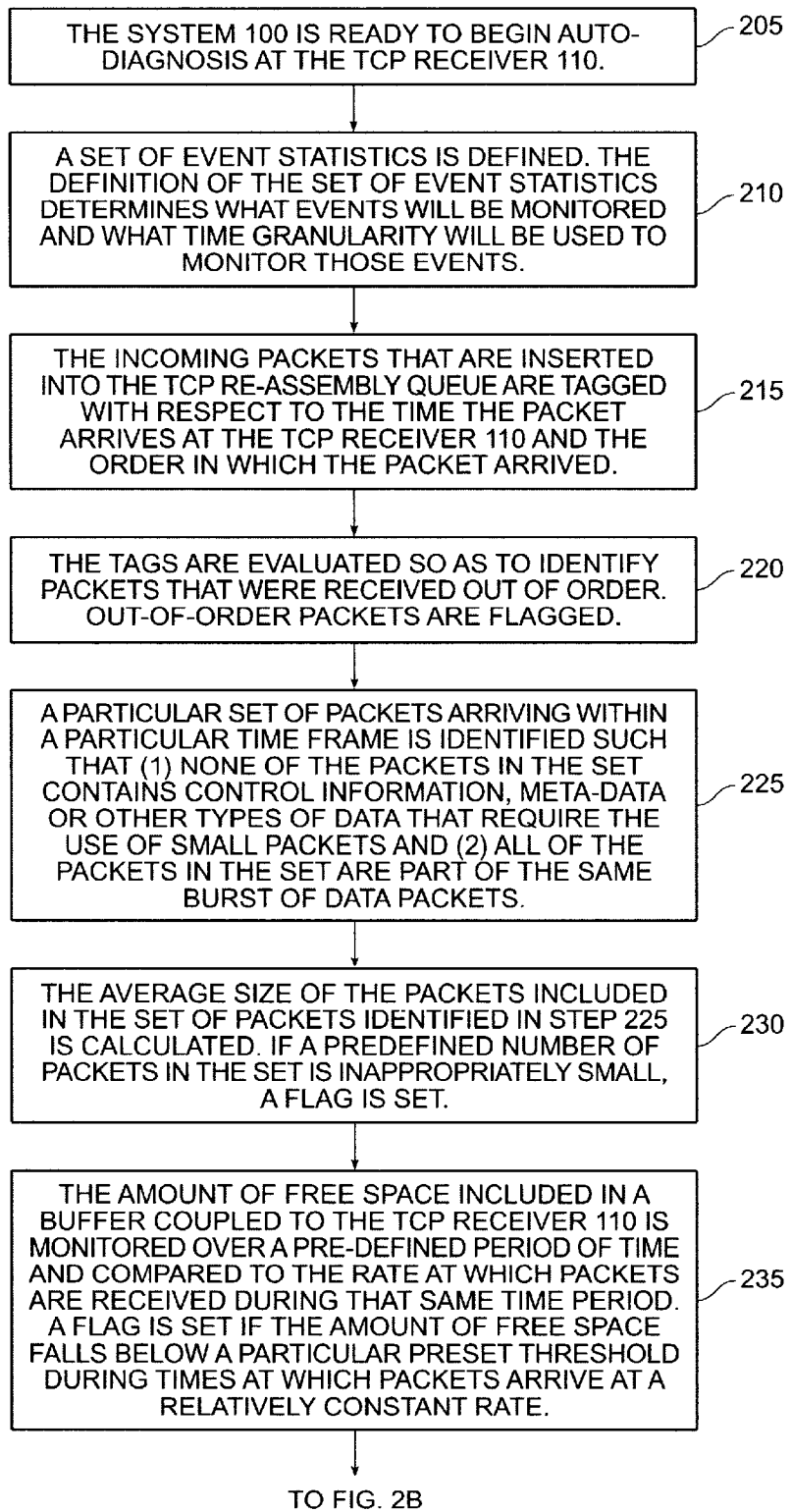
FIGS. 2A and 2B show a process flow diagram of a method of auto-detection of performance limiting factors in a TCP receiver.
Figure 2B:
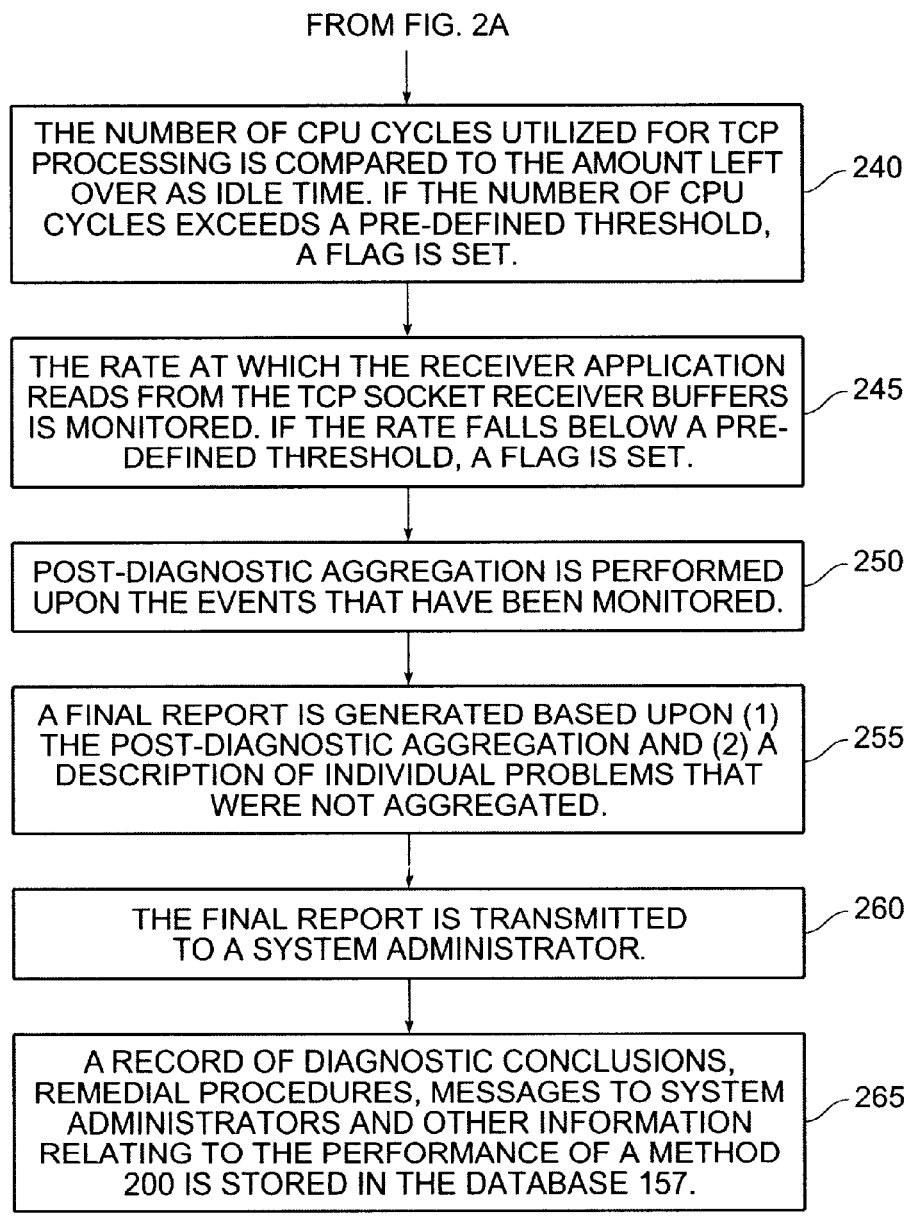

FIGS. 2A and 2B show a process flow diagram of a method of auto-detection of limiting factors in a TCP receiver.

A method 200 auto-diagnosis is performed by an embodiment of the system 100 in which the auto-diagnosis module 150 is coupled to the TCP receiver 110 side. Although the auto-diagnosis method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

At a flow point 205, the system 100 is ready to begin auto-diagnosis at the TCP receiver 110.

In a step 210, a set of event statistics is defined. The definition of the set of event statistics determines what events will be monitored and what time granularity will be used to monitor those events. In a preferred embodiment, it is possible to identify particular events and particular granularity so as to tailor the auto-diagnosis to a particular system.

In a step 215, incoming packets that are inserted into the TCP re-assembly queue are tagged with respect to the time the packet arrives at the TCP receiver 110 and the order in which the packet arrives.

In a step 220, the tags are evaluated so as to identify packets that are received out-of-order. If a packet is identified as arriving out-of-order, and the inter-packet arrival time is above a threshold value, the event is flagged as indicative of a TCP sender 120 re-transmission timeout. An excessive number of such re-transmission timeouts will be deemed as indicative of a performance problem due to some problem in the network path between the sender and the receiver and may be reported to the system administrator. Remedial procedures may be suggested to the administrator or implemented, if possible.

In a step 225, a particular set of packets arriving within a particular time frame is identified such that (1) none of the packets in the set contains control information, meta-data or other types of data that require the use of small packets and (2) all of the packets in the set are part of the same burst of data packets. A "burst" is defined as a set of packets that are transmitted back-to-back by the TCP sender.

In a step 230, the average size of the packets included in the set of packets identified in step 225 is calculated. If a predefined number of packets in the set is inappropriately small, a flag is set indicating that the TCP application may be poorly written or the network may be misconfigured. Remedial procedures may be suggested to the system administrator or implemented.

In a step 235, the amount of free space included in a buffer coupled to the TCP receiver 110 is monitored over a pre-defined period of time and compared to the rate at which packets are received during that same time period. A flag is set if the amount of free space falls below a particular preset threshold during times at which packets arrive at a relatively constant rate. This will be deemed indicative of a situation where the receiver is the bottleneck in data transfer. Remedial procedures may be suggested to the system's administrator or implemented, if possible.

In a step 240, the number of CPU cycles utilized for receiver TCP 110 processing is compared to the amount left over as idle time. If the number of CPU cycles exceeds a pre-defined threshold, a flag is set. This situation is deemed indicative of the receiver system being the bottleneck in data transfer. Remedial procedures may be automatically implemented, if possible.

In a step 245, the rate at which the receiver application reads from the TCP socket receiver buffers is monitored. If the rate falls below a pre-defined threshold, a flag is set. If a flag is set, then remedial procedures may be automatically implemented, if possible.

In a step 250, post-diagnostic aggregation is performed upon the events that have been monitored so that appropriate types and appropriate amounts of data may be presented to a system administrator. This post-diagnostic aggregation includes identifying some or all of the following: (1) groups of client systems that are appropriate for aggregation, (2) a set of one or more attribute types (such as IP subnet number, OS type/version, last configuration change and other factors) that may be particularly relevant, and (3) sets of problems that occurred within these client systems. After determining which client systems are appropriate for aggregation, systems that share a common problem are identified. This is done by looking to the nature and weight given to the various attributes as stored in database 157.

In a step 255, a final report is generated based upon (1) the post-diagnostic aggregation and (2) a description of individual problems that were not aggregated.

In a step 260, the final report is transmitted to a system administrator.

In a step 265, a record of diagnostic conclusions, remedial procedures, messages to system administrators and other information relating to the performance of a method 200 is stored in the database 157.

Figure 3A:
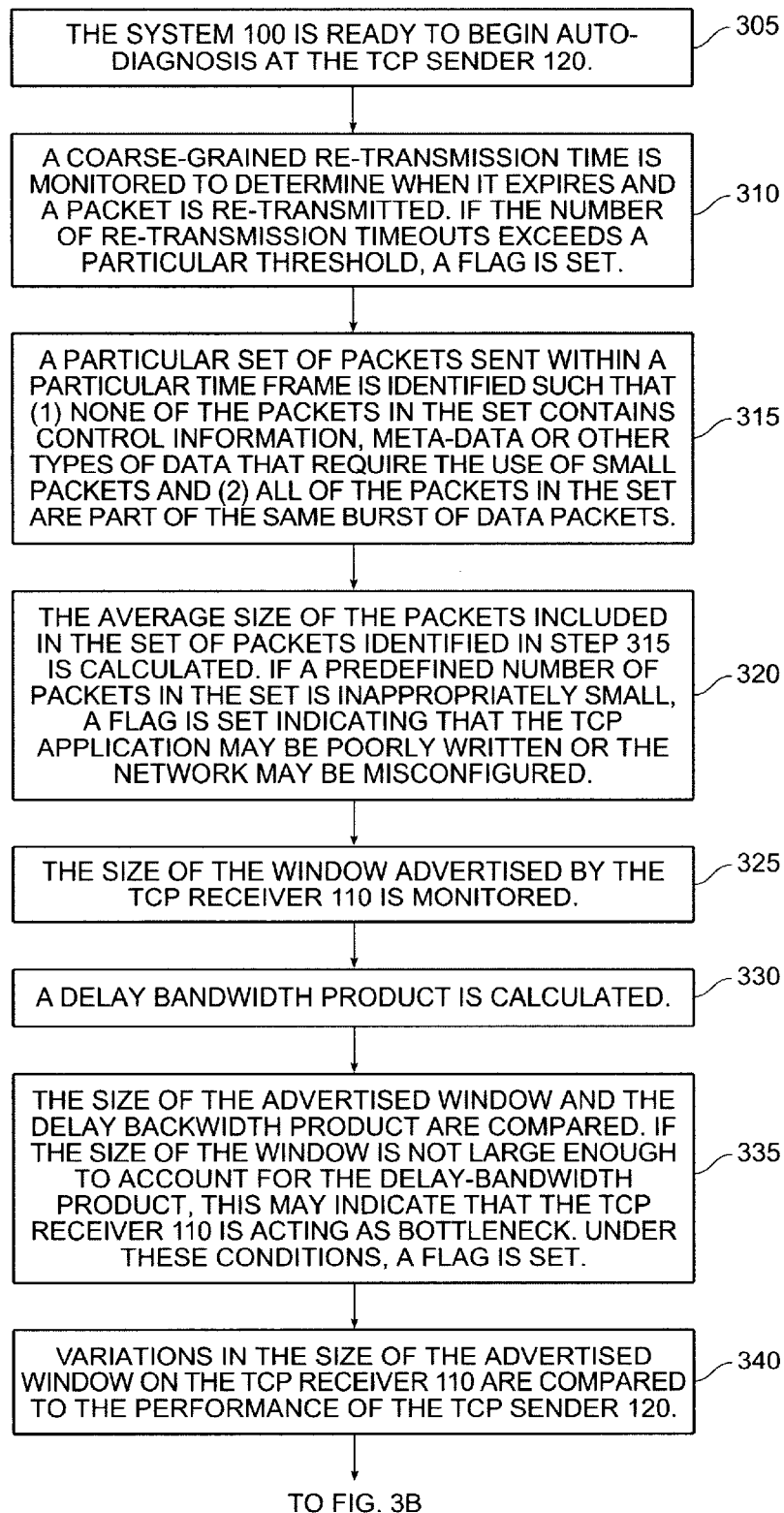
FIGS. 3A and 3B show a process flow diagram of a method of auto-detection of performance limiting factors in a TCP sender.
Figure 3B:
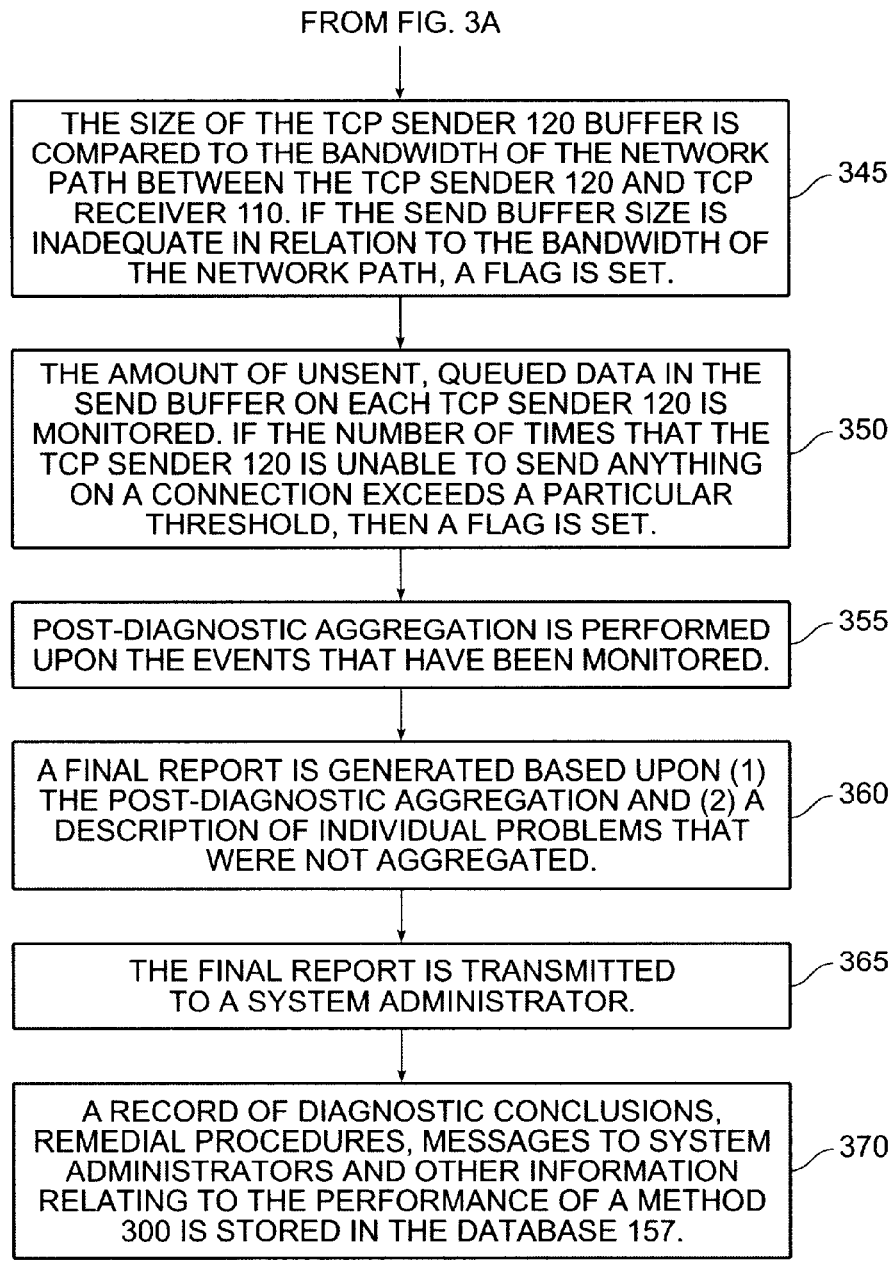

FIGS. 3A and 3B show a process flow diagram of a method of auto-detection of limiting factors in a TCP sender.

A method 300 for auto-diagnosis is performed by an embodiment of the system 100 in which the auto-diagnosis module 150 is coupled to the TCP sender 120 side. Although the auto-diagnosis method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

At a flow point 305, the system 100 is ready to begin auto-diagnosis at the TCP sender 120.

In a step 310, a course grained re-transmission timer is monitored to determine when it expires and a packet is re-transmitted. If the number of re-transmission timeouts exceeds a particular threshold, a flag is set. This situation is deemed indicative of some problem in the network path between the sender and the receiver. Remedial action may be implemented, if possible.

At a step 315, a particular set of packets sent within a particular time frame is identified such that (1) none of the packets in the set contains control information, meta-data or other types of data that require the use of small packets and (2) all of the packets in the set are part of the same burst of data packets.

In a step 320, the average size of the packets included in the set of packets identified in step 315 is calculated. If a predefined number of packets in the set is inappropriately small, a flag is set indicating that the TCP application may be poorly written or the network may be misconfigured. Remedial procedures may be implemented, if possible.

In a step 325, the size of the window advertised by the TCP receiver 110 is monitored.

In a step 330, a delay bandwidth product is calculated.

In a step 335, the size of the advertised window and the delay bandwidth product are compared. If the size of the window is not large enough to account for the delay-bandwidth product, this may indicate that the TCP receiver 110 is acting as bottleneck. Under these conditions, a flag is set, and remedial steps may be taken if possible.

In a step 340, variations in the size of the advertised window on the TCP receiver 110 are compared to the performance of the TCP sender 120. If the size variations fit a predefined pattern, the TCP sender 120 may be acting as a bottleneck. Under these conditions, a flag is set and remedial steps may be taken, if possible.

In a step 345, the size of the TCP sender 120 buffer is compared to the bandwidth of the network path between the TCP sender 120 and TCP receiver 110. If the send buffer size is inadequate in relation to the bandwidth of the network path, then the TCP sender 120 may be a bottleneck. Under these conditions, a flag is set and remedial steps may be taken if possible.

In a step 350, the amount of unsent, queued data in the send buffer on each TCP sender 120 is monitored. If the number of times that the TCP sender 120 is unable to send anything on a connection exceeds a particular threshold, then the TCP sender 120 may be a bottleneck. Under these conditions a flag is set and remedial steps may be taken if possible.

In a step 355, post-diagnostic aggregation is performed upon the events that have been monitored. This step is similar to step 250 in the Method 200. This post-diagnostic aggregation includes identifying (1) groups of client systems that are appropriate for aggregation. (2) a set of one or more attribute types (such as IP subnet number, OS type/version, last configuration change and other factors) that may be particularly relevant or (2) sets of problems that occurred within these client systems. After determining which client systems are appropriate for aggregation, systems that share a common problem are identified by looking to the weight of the various attributes stored in database 157.

In a step 360, a final report is generated based upon (1) the post-diagnostic aggregation and (2) a description of individual problems that were not aggregated.

In a step 365, the final report is transmitted to a system administrator.

In a step 370, a record of diagnostic conclusions, remedial procedures, messages to system administrators and other information relating to the performance of a method 300 is stored in the database 157.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. An apparatus, including
   at least one first computing device, including a processor and a memory, wherein said first computing device is a TCP receiver;
   at least one second computing device, including a processor and a memory; wherein said second computing device is a TCP sender;
   a communications network coupled to said first computing device and said second computing device;
   a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
   a database coupled to said memory associated with said first computing device;
   wherein the instructions for defining said set of data comprise instructions to perform at least one of
      determining average packet size of incoming data packets, and
      determining whether the first computing device creates a bottleneck in data transfer.

2. An apparatus as in claim 1, wherein said instructions for defining a set of data concerning TCP operations includes defining a set of events to monitor and a time granularity in which said events will be monitored.

3. An apparatus, including
   at least one first computing device, including a processor and a memory, wherein said first computing device is a TCP receiver;
   at least one second computing device, including a processor and a memory; wherein said second computing device is a TCP sender;
   a communications network coupled to said first computing device and said second computing device;
   a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and a database coupled to said memory associated with said first computing device;

wherein said set of instructions for evaluating said set of data concerning TCP operations includes a subset of instructions for detecting retransmission timeouts at a TCP receiver, said subset of instructions for detecting retransmission timeouts includes
- an instruction to tag each packet that is inserted into a TCP reassembly queue with a timestamp and a sequence number;
- an instruction to read each tag and sort so as to identify said tags that are not in sequential order;
- an instruction to generate a flag for every said tag that is not in sequential order; and
- store said flags in said memory included in said first computing device.

4. An apparatus as in claim 1, wherein said set of instructions for evaluating said set of data concerning TCP operations includes a subset of instructions for evaluating the average packet size of incoming packets.

5. An apparatus, including
at least one first computing device, including a processor and a memory, wherein said first computing device is a TCP receiver;
at least one second computing device, including a processor and a memory, wherein said second computing device is a TCP sender;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device;
wherein said set of instructions for evaluating said set of data concerning TCP operations includes a subset of instructions for evaluating the average packet size of incoming packets, said subset of instructions for evaluating the average packet size includes
- an instruction to identify packets that are included in burst of back-to-back packets;
- an instruction to evaluate the size of said identified packets;
- an instruction to generate a flag if any packet included in said burst of back-to-back packets falls below a pre-set threshold; and
- an instruction to store said flags in said memory included in said first computing device.

6. An apparatus as in claim 1, wherein said set of instructions for evaluating said set of data concerning TCP operations includes at least three subsets of instructions for checking whether the first computing device causes a bottleneck check in data transfer between the first and second computing devices.

7. An apparatus, including
at least one first computing device, including a processor and a memory, wherein said first computing device is a TCP receiver;
at least one second computing device, including a processor and a memory, wherein said second computing device is a TCP sender;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device;
wherein said set of instructions for evaluating said set of data concerning TCP operations includes at least three subsets of instructions for performing a bottleneck check at a receiver TCP, one of said at least three subsets of instructions includes
- an instruction to monitor the advertised window size in said first computing device;
- an instruction to monitor the rate at which packets arrive at said first computing device;
- an instruction to generate a flag if the size of said advertised window falls below a certain threshold while said rate at which packets arrive remains within a predefined range; and
- an instruction to store said flags in said memory included in said first computing device.

8. An apparatus, including
at least one first computing device, including a processor and a memory, wherein said first computing device is a TCP receiver;
at least one second computing device, including a processor and a memory wherein said second computing device is a TCP sender;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device;
wherein said set of instructions for evaluating said set of data concerning TCP operations includes at least three subsets of instructions for performing a bottleneck check at a receiver TCP, one of said at least three subsets of instructions includes
- an instruction to monitor the number of cycles associated with said processor included in said first computing device, that are utilized for processing of TCP protocol;
- an instruction to monitor the amount of cycles of said processor associated with said first computing device that is characterized as idle time;
- an instruction to compare the result of monitoring the amount of cycles of said processor associated with said first computing device that is characterized as idle time with the result of monitoring the number of cycles of said processor included in said first computing device that is utilized for processing of TCP protocol;
- an instruction to generate a flag if the ratio between the amount of cycles of said processor associated with said first computing device that is characterized as idle time and the number of cycles of said processor included in said first computing device that is utilized for processing of TCP protocol falls below a pre-set threshold; and an instruction to store said flag in said memory included in said first computing device.

9. An apparatus, including
at least one first computing device, including a processor and a memory, wherein said first computing device is a TCP receiver;
at least one second computing device, including a processor and a memory, wherein said second computing device is a TCP sender;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device;
wherein said set of instructions for evaluating said set of data concerning TCP operations includes at least three subsets of instructions for performing a bottleneck check at a receiver TCP, one of said at least three subsets of instructions includes
an instruction to monitor the rate at which said first computing device reads from the TCP buffers;
an instruction to compare said rate at which said first computing device reads to a standard rate;
an instruction to generate a flag if said rate at which said first computing device reads exceeds said standard rate by a predetermined value; and
an instruction to store said flag in said memory included in said first computing device.

10. An apparatus as in claim 1, wherein said set of instructions also includes a subset of instructions to aggregate said result, the subset including instructions to identify at least one of following items:
one or more attributes of client systems; and
one or more problems that occurred within the client systems.

11. An apparatus as in claim 10, wherein said subset of instructions to aggregate includes an instruction to aggregate based upon information stored in said database.

12. An instruction as in claim 10, wherein said subset of instructions to aggregate include an instruction to aggregate based upon said result.

13. An apparatus, including
at least one first computing device, including a processor and a memory, wherein said first computing device is a TCP sender;
at least one second computing device, including a processor and a memory; wherein said second computing device is a TCP receiver;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device.

14. An apparatus as in claim 13, wherein said instructions for defining a set of data concerning TCP operations includes defining a set of events to monitor and a time granularity in which said events will be monitored.

15. An apparatus, including
at least one first computing device, including a processor and a memory, wherein said first computing device is a TCP sender;
at least one second computing device, including a processor and a memory, wherein said second computing device is a TCP receiver;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device;
wherein said set of instructions for evaluating said set of data concerning TCP operations includes a subset of instructions for detecting retransmission timeouts at said first computing device, said subset of instructions for detecting retransmission timeouts includes
an instruction to determine when a re-transmission time expires and packets are retransmitted;
an instruction to measure the number of re-transmissions occurred within a predetermined time period;
an instruction to generate a flag if said number of re-transmissions exceeds a predetermined threshold; and
an instruction to store said flags in said memory included in said first computing device.

16. An apparatus as in claim 13, wherein said set of instructions for evaluating said set of data concerning TCP operations includes a subset of instructions for evaluating the average packet size of outgoing packets.

17. An apparatus, including
at least one first computing device, including a processor and a memory, wherein said first computing device is a TCP sender;
at least one second computing device, including a processor and a memory, wherein said second computing device is a TCP receiver;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device;
wherein said set of instructions for evaluating said set of data concerning TCP operations includes a subset of instructions for evaluating the average packet size of outgoing packets, said subset of instructions for evaluating the average packet size includes
an instruction to identify packets that are included in burst of back-to-back packets;
an instruction to evaluate the size of said identified packets;
an instruction to generate a flag if any packet included in said burst of back-to-back packets falls below a pre-set threshold; and an instruction to store said flags in said memory of said first computing device.

18. An apparatus as in claim 13, wherein said set of instructions includes a subset of instructions for monitoring the receiver window associated with said second computing device.

19. An apparatus, including
at least one first computing device, including a processor and a memory wherein said first computing device is a TCP sender;
at least one second computing device, including a processor and a memory, wherein said second computing device is a TCP receiver;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device;
wherein said set of instructions includes a subset of instructions for monitoring the receiver window associated with said second computing device, said subset of instructions for monitoring said receiver window includes
an instruction to monitor the variation of space available in said receiver window over time;
an instruction to generate a flag if said variation in space available in said window fits a particular predetermined pattern; and
an instruction to store said flags in said memory included in said first computing device.

20. An apparatus as in claim 13, wherein said set of instructions for evaluating said set of data concerning TCP operations includes at least three subsets of instructions for checking whether the first computing device causes a bottleneck check in data transfer between the first and second computing devices.

21. An apparatus, including
at least one first computing device, including a processor and a memory, wherein said first computing device is a TCP sender;
at least one second computing device, including a processor and a memory, wherein said second computing device is a TCP receiver;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device;
wherein said set of instructions for evaluating said set of data concerning TCP operations includes at least three subsets of instructions for performing a bottleneck check at a sender TCP, one of said at least three subsets of instructions includes
an instruction to monitor the size of a buffer associated with said first computing device;
an instruction to monitor the rate at which packets are transmitted;
an instruction to generate a flag if the space available in said buffer falls below a certain threshold while said rate at which packets are transmitted remains within a predefined range;
an instruction to store said flag in said memory included in said first computing device.

22. An apparatus, including
at least one first computing device, including a processor and a memory, wherein said first computing device is a TCP sender;
at least one second computing device, including a processor and a memory, wherein said second computing device is a TCP receiver;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device;
wherein said set of instructions for evaluating said set of data concerning TCP operations includes at least three subsets of instructions for performing a bottleneck check at a sender TCP, one of said at least three subsets of instructions includes
an instruction to monitor the amount of unsent queued data in a buffer associated with said first computing device;
an instruction to count the number of times that the first computing device is unable to transmit said unsent queued data during a pre-set interval of time;
an instruction to generate a flag if said number of times said first computing device is unable to transmit exceeds a pre-set threshold; and
an instruction to store said flag in said memory included in said first computing device.

23. An apparatus, including
at least one first computing device, including a processor and a memory, wherein said first computing device is a TCP sender;
at least one second computing device, including a processor and a memory, wherein said second computing device is a TCP receiver;
a communications network coupled to said first computing device and said second computing device;
a set of instructions coupled to said memory associated with said first computing device, wherein said set of instructions includes instructions for (1) defining a set of data concerning TCP operations, (2) evaluating said set of data concerning TCP operations, and (3) generating a result of said evaluating; and
a database coupled to said memory associated with said first computing device;
wherein said set of instructions for evaluating said set of data concerning TCP operations includes at least three subsets of instructions for performing a bottleneck check at a sender TCP, wherein one of at least three subsets of instructions includes
an instruction to monitor the rate that said first computing device performs protocol processing;

an instruction to monitor the data consumption bandwidth of said second computing device;

an instruction to compare said rate of protocol processing with said data consumption bandwidth;

an instruction to generate a flag if the ratio between said rate and said bandwidth exceeds a pre-set threshold; and an instruction to store said flag in said memory included in said first computing device.

24. An apparatus as in claim 13, wherein said set of instructions also includes instructions to aggregate said result, said instructions to aggregate including instructions to identify at least one of following items:

one or more attributes of one or more client systems; and one or more problems that occurred within the one or more client systems.

25. An apparatus as in claim 24, wherein said instructions to aggregate include an instruction to aggregate based upon information stored in said database.

26. An apparatus as in claim 24, wherein said instructions to aggregate include an instruction to aggregate based upon said result.

27. A method, including steps of defining a set of data concerning TCP operations;

evaluating the performance of a TCP receiver or a TCP sender;

generating a set of data regarding said performance; and aggregating said set of data according to at least one of following items:

one or more attributes of one or more client systems; and one or more problems that occurred within the one or more client systems.

28. A method as in claim 27, wherein said step of defining a set of data includes steps of defining a set of events to monitor; and defining a time granularity in which said set of events will be monitored.

29. A method as in claim 27, wherein said step of evaluating said performance includes steps of detecting retransmission timeouts at a TCP receiver by looking to the time and order in which data packets are received evaluating the average size of incoming packets included in a burst of back-to-back packets;

monitoring the advertised window size of said TCP receiver and comparing the advertised window size to the rate at which said data packets are received;

monitoring the number of processor cycles used to perform TCP protocols and comparing the number of processor cycles used to perform TCP protocols to the number of cycles characterized as idle time; and monitoring the rate at which said TCP receiver reads from a buffer and comparing the rate at which said TCP receiver reads from the buffer to a standard rate.

30. A method as in claim 27, wherein said step of evaluating said performance includes steps of detecting retransmission timeouts by monitoring when a re-transmission time expires and packets are re-transmitted by the TCP sender;

evaluating the average size of outgoing packets by monitoring the size of said outgoing packets included in a burst of back-to-back outgoing packets;

monitoring the size of a receiver window associated with the TCP receiver;

monitoring patterns in the size of said receiver window;

monitoring the size of a buffer associated with said TCP sender and comparing to the rate at which said packets are transmitted;

monitoring the amount of unsent queued data in said buffer associated with the TCP sender; and monitoring the rate at which protocol processing is performed and comparing the rate at which protocol processing is performed to data consumption bandwidth.

31. A method as in claim 27, wherein said step of aggregating includes aggregating based upon (1) attributes of a computing device and (2) results associated with said set of data.

32. Apparatus as in claim 10, wherein the subset of instructions to perform aggregation includes instructions to identify at least one IP subnet number of a client system.

33. Apparatus as in claim 10, wherein the subset of instructions to perform aggregation includes instructions to identify type and version of OS of at least one client system.

34. Apparatus as in claim 10, wherein the subset of instructions to perform aggregation includes instructions to identify last configuration change date of at least one client system.

35. Apparatus as in claim 10, wherein the subset of instructions to perform aggregation includes instructions to identify delay distance to at least one client system.

36. Apparatus as in claim 10, wherein the subset of instructions to perform aggregation includes instructions to identify virtual LAN information of at least one client system.

37. Apparatus as in claim 10, wherein the subset of instructions to perform aggregation includes instructions to generate a historical summary of auto-diagnosis information.

38. Apparatus as in claim 24, wherein the subset of instructions to perform aggregation includes instructions to identify at least one IP subnet number of a client system.

39. Apparatus as in claim 24, wherein the subset of instructions to perform aggregation includes instructions to identify type and version of OS of at least one client system.

40. Apparatus as in claim 24, wherein the subset of instructions to perform aggregation includes instructions to identify last configuration change date of at least one client system.

41. Apparatus as in claim 24, wherein the subset of instructions to perform aggregation includes instructions to identify delay distance to at least one client system.

42. Apparatus as in claim 24, wherein the subset of instructions to perform aggregation includes instructions to identify virtual LAN information of at least one client system.

43. Apparatus as in claim 24, wherein the subset of instructions to perform aggregation includes instructions to generate a historical summary of auto-diagnosis information.

44. An apparatus, including at least one first computing device, including a processor and a memory, wherein said first computing device is a TCP sender;

at least one second computing device, including a processor and a memory, wherein said second computing device is a TCP receiver;

a communications network coupled to said first computing device and said second computing device;

a set of instructions coupled to said memory associated with said second computing device, wherein said set of instructions includes instructions for (1) defining a set of data concerning TCP operations, (2) evaluating said set of data concerning TCP operations, and (3) generating a result of said evaluating; and a database coupled to said memory associated with said first computing device;

wherein said set of instructions for evaluating said set of data concerning TCP operations includes a subset of instructions for evaluating the average packet size of outgoing packets, said subset of instructions for evaluating the average packet size includes an instruction to identify packets that are included in burst of back-to-back packets;

an instruction to evaluate the size of the identified packets;

an instruction to generate a flag if any packet included in said burst of back-to-back packets falls below a pre-set threshold; and an instruction to store said flags in said memory.

45. An apparatus, including at least one first computing device, including a processor and a memory, wherein said first computing device is a TCP sender;

at least one second computing device, including a processor and a memory, wherein said second computing device is a TCP receiver;

a communications network coupled to said first computing device and said second computing device;

a set of instructions coupled to said memory associated with said second computing device, wherein said set of instructions includes instructions for (1) defining a set of data concerning TCP operations, (2) evaluating said set of data concerning TCP operations, and (3) generating a result of said evaluating; and a database coupled to said memory associated with said first computing device;

wherein said set of instructions includes a subset of instructions for monitoring the receiver window associated with said second computing device, said subset of instructions for monitoring said receiver window includes an instruction to monitor the variation of space available in said receiver window over time;

an instruction to generate a flag if said variation in space available in said window fits a particular predetermined pattern; and an instruction to store said flags in said memory included in said second computing device.

46. An apparatus, including at least one first computing device, including a processor and a memory, wherein said first computing device is a TCP sender;

at least one second computing device, including a processor and a memory, wherein said second computing device is a TCP receiver;

a communications network coupled to said first computing device and said second computing device;

a set of instructions coupled to said memory associated with said second computing device, wherein said set of instructions includes instructions for (1) defining a set of data concerning TCP operations, (2) evaluating said set of data concerning TCP operations, and (3) generating a result of said evaluating; and a database coupled to said memory associated with said first computing device;

wherein said set of instructions for evaluating said set of data concerning TCP operations includes at least three subsets of instructions for performing a bottleneck check at a sender TCP, one of said at least three subsets of instructions includes an instruction to monitor the size of a buffer associated with said first computing device;

an instruction to monitor the rate at which packets are transmitted;

an instruction to generate a flag if the space available in said buffer falls below a certain threshold while said rate at which packets are transmitted remains within a predefined range;

an instruction to store said flag in said memory associated with said second computing device.

47. An apparatus, including at least one first computing device, including a processor and a memory, wherein said first computing device is a TCP sender;

at least one second computing device, including a processor and a memory, wherein said second computing device is a TCP receiver;

a communications network coupled to said first computing device and said second computing device;

a set of instructions coupled to said memory associated with said second computing device, wherein said set of instructions includes instructions for (1) defining a set of data concerning TCP operations, (2) evaluating said set of data concerning TCP operations, and (3) generating a result of said evaluating; and a database coupled to said memory associated with said first computing device;

wherein said set of instructions for evaluating said set of data concerning TCP operations includes at least three subsets of instructions for performing a bottleneck check at a sender TCP, one of said at least three subsets of instructions includes one of said at least three subsets of instructions includes an instruction to monitor the amount of unsent queued data in a buffer associated with said first computing device;

an instruction to count the number of times that the first computing device is unable to transmit said unsent queued data during a pre-set interval of time;

an instruction to generate a flag if said number of times said first computing device is unable to transmit exceeds a pre-set threshold; and an instruction to store said flag in said memory associated with said second computing device.

48. A system for performing TCP diagnostics, comprising:

a processor coupled to a first TCP information appliance communicating with one or more second TCP information appliances over a communications network, and a memory coupled to the processor, the memory storing a set of instructions that, when executed by the processor, cause the processor to (1) define a set of data concerning TCP communications, the set of data including at least one of determining average packet size of data packets, and determining whether the first TCP information appliance creates a bottleneck in data transfer between the first TCP information appliance and the one or more second TCP information appliances, and (2) evaluate the set of data to generate a result.

49. A system in accordance with claim 48, further comprising a database coupled to the processor, wherein the set of instructions, when executed by the processor, further causes the processor to aggregate the set of data according to at least one of the following:

one or more attributes of the one or more second TCP information appliances; and one or more problems in the one or more second TCP information appliances;

wherein the database stores the one or more attributes and the one or more problems used to aggregate the set of data.

* * * * *